(12) United States Patent
Rajapaksha et al.

(10) Patent No.: US 12,051,978 B2
(45) Date of Patent: Jul. 30, 2024

(54) DATA AND POWER ISOLATION BARRIER

(71) Applicant: TEXAS INSTRUMENTS INCORPORATED, Dallas, TX (US)

(72) Inventors: Dushmantha Bandara Rajapaksha, Allen, TX (US); Roland Sperlich, Rockwall, TX (US); Anant Shankar Kamath, Bengaluru (IN); Vijayalakshmi Devarajan, Plano, TX (US); Wesley Ray, Frisco, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/813,366

(22) Filed: Jul. 19, 2022

(65) Prior Publication Data

US 2023/0336083 A1 Oct. 19, 2023

Related U.S. Application Data

(62) Division of application No. 16/903,618, filed on Jun. 17, 2020, now Pat. No. 11,443,889.

(Continued)

(51) Int. Cl.
*H02M 3/335* (2006.01)
*H01F 27/28* (2006.01)
(Continued)

(52) U.S. Cl.
CPC ...... *H02M 3/33523* (2013.01); *H01F 27/288* (2013.01); *H02M 1/4258* (2013.01);
(Continued)

(58) Field of Classification Search
None
See application file for complete search history.

(56) References Cited

U.S. PATENT DOCUMENTS 4,223,313 A 9/1980 Chabrol
5,272,350 A 12/1993 Solari
(Continued)

FOREIGN PATENT DOCUMENTS

EP 3157152 A2 4/2017
GB 2483374 A 3/2012
(Continued)

OTHER PUBLICATIONS

Supplemental European Search Report, Application No. 20833531. 5, dated Jul. 18, 2022, 15 pgs.
(Continued)

*Primary Examiner* — Jeffery S Zweizig
(74) *Attorney, Agent, or Firm* — Valerie M. Davis; Frank D. Cimino

(57) ABSTRACT

A semiconductor package includes a transformer having a primary winding and a secondary winding. The primary winding has first and second terminals and a pair of taps. The secondary winding has first and second terminals and a pair of taps. The semiconductor package includes first and second data transfer circuits, a bridge, and a rectifier. The first data transfer circuit is coupled to the pair of taps of the primary winding. The second data transfer circuit is coupled to the pair of taps of the secondary winding. The bridge is coupled to the first and second terminals of the primary winding. The rectifier is coupled to the first and second terminals of the secondary winding.

20 Claims, 4 Drawing Sheets

Related U.S. Application Data

(60) Provisional application No. 62/865,516, filed on Jun. 24, 2019.

(51) Int. Cl.
  *H02M 1/42* (2007.01)
  *H02M 3/155* (2006.01)
  *H04L 13/02* (2006.01)
  *H02M 3/00* (2006.01)

(52) U.S. Cl.
  CPC ....... *H02M 3/155* (2013.01); *H02M 3/33569* (2013.01); *H02M 3/33573* (2021.05); *H04L 13/02* (2013.01); *H02M 3/01* (2021.05)

(56) References Cited

U.S. PATENT DOCUMENTS

| | | | |
|---|---|---|---|
| 5,747,894 A | 5/1998 | Hirai | |
| 6,188,327 B1 | 2/2001 | Cousins | |
| 6,466,126 B2 * | 10/2002 | Collins | G06K 19/0707 340/636.15 |
| 7,773,733 B2 | 8/2010 | Bart et al. | |
| 8,198,968 B2 | 6/2012 | Oliaei et al. | |
| 8,618,630 B2 | 12/2013 | Kaeriyama | |
| 8,861,229 B2 * | 10/2014 | Alfano | H03K 17/691 363/16 |
| 8,963,622 B2 | 2/2015 | Lee et al. | |
| 9,544,027 B2 | 1/2017 | Cornell et al. | |
| 9,866,283 B2 | 1/2018 | Subramonian et al. | |
| 10,298,408 B2 | 5/2019 | Ragonese et al. | |
| 2006/0039169 A1 | 2/2006 | Chen et al. | |
| 2007/0254726 A1 | 11/2007 | Iida | |
| 2009/0102590 A1 | 4/2009 | Rhodes et al. | |
| 2010/0200295 A1 | 8/2010 | Schimanski | |
| 2015/0180528 A1 | 6/2015 | Ragonese et al. | |

FOREIGN PATENT DOCUMENTS

| | | |
|---|---|---|
| WO | 8910030 A1 | 10/1989 |
| WO | 2013096295 A1 | 6/2013 |

OTHER PUBLICATIONS

Supta Shivani, "Wireless Power Transmission Technology", NewsTriger, Aug. 24, 2016, https://www.newstriger.com/wireless-power-transmission-technology/, 1 pg.

Choi Hee-Su et al, "Compact Drive Circuit for Capacitive Wireless Power Transfer System Utilizing Leakage-Enhanced Transformer", Journal of Electrical Engineering & Technology, vo. 14, No. 1, Jan. 1, 2019, pp. 191-199, http://eccl.ulsan.ac.kr/upload/publications/pdf/Hee%20su.pdf.

Texas Instruments. "ISOW784x High-performance, 5000-VRMS reinforced quad-channel digital isolators with integrated high-efficiency, low-emissions DC-DC converter." SLLSEY2F—Mar. 2017—Revised Mar. 2019, pp. 1-52.

International Search Report in corresponding PCT Application No. PCT/Us2020/039232, dated Sep. 24, 2020 (2 pages).

European Patent Office Communication pursuant to Article 94(3) EPC, App. No. 20 833 531.5-1202, dated Sep. 14, 2023, 11 pgs.

* cited by examiner

DATA AND POWER ISOLATION BARRIER

CROSS-REFERENCE TO RELATED APPLICATIONS

This application claims priority to U.S. Provisional Application No. 62/865,516, filed Jun. 24, 2019, and U.S. application Ser. No. 16/903,618, filed Jun. 17, 2020, which are hereby incorporated by reference.

BACKGROUND

Some circuits benefit from the circuits' power and data nodes being isolated from other circuits and power nodes. For example, sensitive circuits in a power tools or other types of high voltage machines benefit from such circuits being isolated from the AC (alternating current) power mains.

SUMMARY

In one example, a semiconductor package includes a transformer having a primary winding and a secondary winding. The primary winding has first and second terminals and a pair of taps. The secondary winding has first and second terminals and a pair of taps. The semiconductor package includes first and second data transfer circuits, a bridge, and a rectifier. The first data transfer circuit is coupled to the pair of taps of the primary winding. The second data transfer circuit is coupled to the pair of taps of the secondary winding. The bridge is coupled to the first and second terminals of the primary winding. The rectifier is coupled to the first and second terminals of the secondary winding.

In yet another example, an apparatus includes a transformer, first and second data transfer circuits, a transformer driver, and a rectifier. The transformer has primary and secondary windings. The primary winding has first and second terminals and a center tap. The secondary winding has first and second terminals and a center tap. The center tap of the primary winding is coupled to a supply voltage node. The center tap of the secondary winding provides an isolated ground. The first data transfer circuit is coupled to the first and second terminals of the primary winding. The second data transfer circuit is coupled to the first and second terminals of the secondary winding. The transformer driver is coupled to the first and second terminals of the primary winding. The rectifier has first and second rectifier inputs and a rectifier output. The first rectifier input is coupled to the first terminal of the secondary winding. The second rectifier input is coupled to the second terminal of the secondary winding.

In yet another example, a circuit includes a modulator, an oscillator, a transmitter, a transformer driver, and first and second capacitors. The modulator has an input and an output. The oscillator is coupled to the input of the modulator. The transmitter has an input and first and second outputs. The input of the transmitter is coupled to the output of the modulator. The transformer driver has first and second terminals configured to be coupled to terminals of a transformer. The first capacitor is coupled between the first output of the transmitter and the first terminal of the transformer driver. The second capacitor is coupled between the second output of the transmitter and the second terminal of the transformer driver.

In another example, a circuit includes a modulator, an oscillator, a transmitter, a transformer driver, first and second capacitors, and a rectifier. The modulator has an input and an output. The oscillator is coupled to the input of the modulator. The transmitter has an input and first and second outputs. The input of the transmitter is coupled to the output of the modulator. The first capacitor has first and second terminals with the first terminal of the first capacitor being coupled to the first output of the transmitter and the second terminal of the first capacitor configured to be coupled to a first terminal of a transformer. The second capacitor has first and second terminals with the first terminal of the second capacitor being coupled to the second output of the transmitter and the second terminal of the second capacitor configured to be coupled to a second terminal of the transformer. The rectifier has first and second rectifier inputs and an output. The first rectifier input is coupled to the second terminal of the first capacitor and the second rectifier input is coupled to the second terminal of the second capacitor.

BRIEF DESCRIPTION OF THE DRAWINGS

For a detailed description of various examples, reference will now be made to the accompanying drawings in which.

DETAILED DESCRIPTION

Some isolation barrier implementations include separate isolation barriers for data and power. That is, one isolation barrier is used to isolate data inputs and outputs of a circuit from external data connections, and another isolation barrier is used to isolate power, Size and cost are increased when using separate isolation barriers for data and power. In accordance with a disclosed example, one isolation barrier is used for both data and power. In this example, data is modulated on to the same isolation channel as is used for power isolation.

Figure 1:
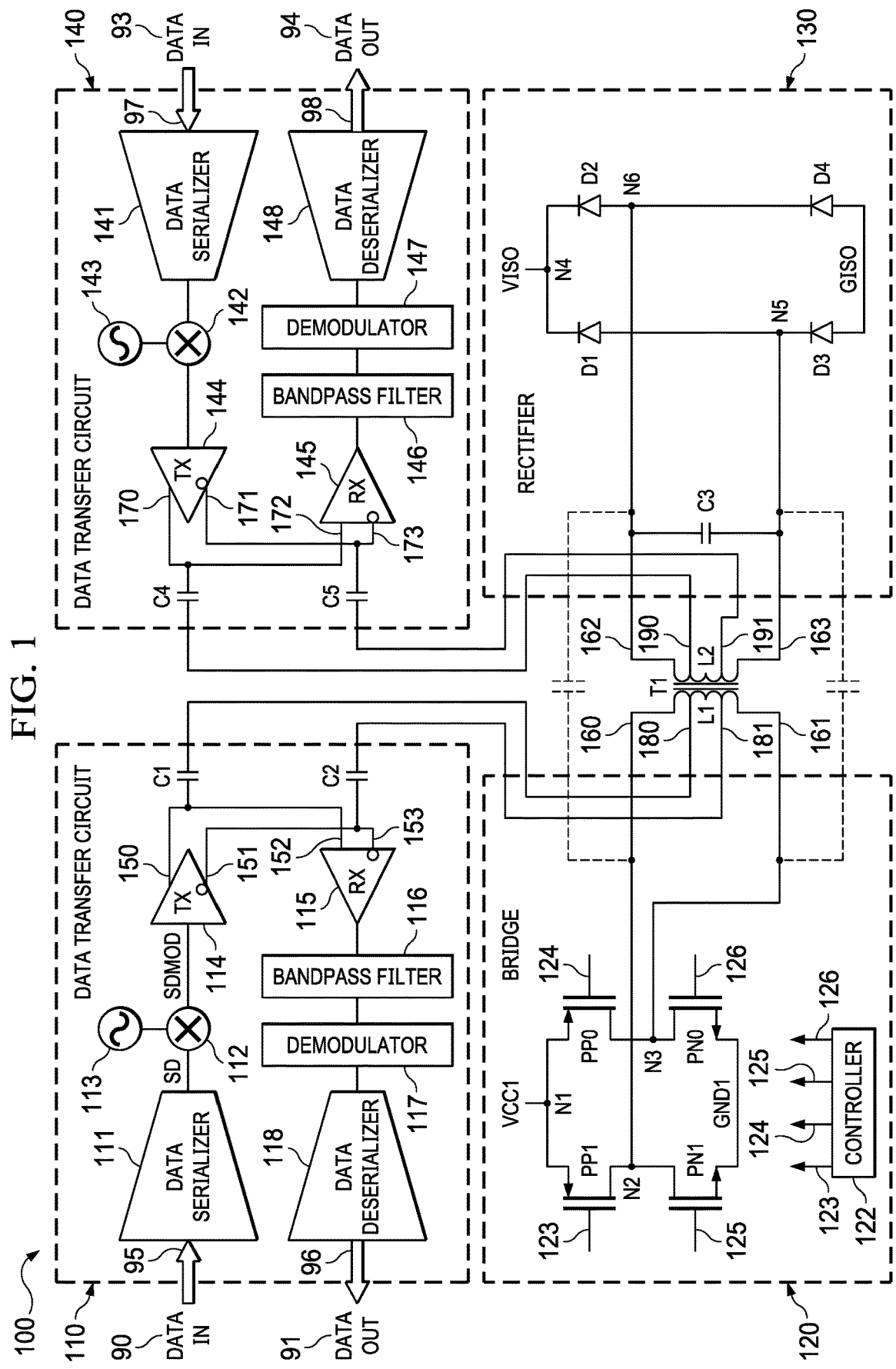
FIG. 1 illustrates an example of an isolation circuit.

FIG. 1 shows an example of an isolation circuit 100. In this example, isolation circuit 100 includes data transfer circuits 110 and 140, a bridge 120, a transformer T1, and a rectifier 130. The data path through the illustrated isolation circuit 100 is bi-directional. As such, data transfer circuit 110 includes a data input 95 that can receive incoming data (DATA IN 91) to be transferred through the isolation circuit 100 and output via data output 98 of data transfer circuit 140 as output data (DATA OUT 94). Similarly, data transfer circuit 140 includes a data input 97 that can receive incoming data (DATA IN 93) to be transferred through the isolation circuit 100 and output via data output 96 of data transfer circuit 110 as output data (DATA OUT 91). Bridge 120, coupled to the primary winding L1 of transformer T1, receives an input voltage (VCC1) and rectifier 130, coupled to the secondary winding L2 of transformer T1, provides an isolated output voltage VISO. VISO is galvanically isolated from VCC1 and GND1. Transformer T1 is used to isolate both data and power.

The data transfer circuit 110 includes a data serializer 111, a modulator 112, an oscillator 113, a transmitter (TX) 114, a receiver (RX) 115, a bandpass filter 116, a demodulator 117, a data deserializer 118, and capacitors C1 and C2. Data input 95 of the data transfer circuit 110 is the input to the data serializer 111. The output of the data serializer 111 is coupled to one input of the modulator 112. In one example, the modulator 112 is a mixer. The oscillator 113 is coupled to another input of the modulator 112. The output of the modulator 112 is coupled to an input of the transmitter 114. The transmitter 114 has a positive output 150 and a negative output 151. The positive output 150 of transmitter 114 is coupled to one terminal of capacitor C1 and to a positive input 152 of receiver 115. The negative output 151 of transmitter 114 is coupled to one terminal of capacitor C2 and to a negative input 153 of receiver 115. The output of the receiver 115 is coupled to an input of the bandpass filter 116, and the output of the bandpass filter 116 is coupled to an input of the demodulator 117. The output of the demodulator 117 is coupled to an input of the data deserializer 118, and the output of the data deserializer provides DATA OUT 91.

The bridge 120 includes transistors PP0, PP1, PN0, and PN1. In the configuration shown, bridge 120 comprises a full bridge. In the example of FIG. 1, PP0 and PP1 comprise p-type metal oxide semiconductor field effect transistors (PMOS) and PN0 and PN1 comprise n-type metal oxide semiconductor field effect transistors (NMOS). Different types of transistors can be used in other implementations. The sources of PP0 and PP1 are coupled together at node N1. Node N1 also is coupled to an input voltage node to receive the input voltage VCC1. The drains of PP1 and PN1 are coupled together at node N2. The drains of PP0 and PN0 are coupled together at node N3. The sources of PN1 and PN0 are coupled together at a ground node (GND1). A controller 122 generates the control signals 123, 124, 125, and 126 for the gates of the respective PP1, PP0, PN1, and PN0 as shown. Primary winding L1 has terminals 160 and 161. Terminal 160 is coupled to node N2 and terminal 161 is coupled to node N3.

In operation, the controller 122 causes PP1 and PN0 to be on simultaneously (while PN0 and PN1 are off) and reciprocally causes PP0 and PN1 to be on simultaneously (while PP1 and PN0 are off). With PP1 and PN0 both on, the VCC1 voltage is applied to terminal 160 of the primary winding L1 and ground GND1 to terminal 161 of the primary winding. Reciprocally, with PP0 and PN1 both on, the VCC1 voltage is applied to terminal 161 of the primary winding L1 and ground GND1 to terminal 160 of the primary winding. As such, a switching waveform is applied to the terminals of the primary winding L1 at a switching frequency (Fs) set by the controller 122.

The secondary winding L2 includes terminals 162 and 163 which coupled to the rectifier 130. Rectifier 130 comprises a full wave bridge rectifier including diodes D1-D4. The cathodes of D1 and D2 are coupled together at node N4. The voltage on node N4 is the isolated output voltage VISO. The anode of D1 is coupled to the cathode D3 at node N5 and the anode of D2 is coupled to the cathode D4 at node N6. The anodes of D3 and D4 are coupled together and provide the isolated ground node (GISO). GISO is galvanically isolated from GND1 and VCCI. Terminal 162 of secondary winding L2 is coupled to node N6 and terminal 163 of the secondary winding is coupled to node N5. A capacitor C3 is coupled across the secondary winding L2 between terminals 162 and 163.

Data transfer circuit 140 has an architecture similar to that of data transfer circuit 140. Data transfer circuit 140 includes a data serializer 141, a modulator 142, an oscillator 143, a transmitter 144, a receiver 145, a bandpass filter 146, a demodulator 147, a data deserializer 148, and capacitors C4 and C5. Data input 93 of the data transfer circuit 140 is the input to the data serializer 141. The output of the data serializer 141 is coupled to one input of the modulator 142. In one example, the modulator 142 is a mixer. The oscillator 143 is coupled to another input of the modulator 142. The output of the modulator 142 is coupled to an input of the transmitter 144. The transmitter 144 has a positive output 170 and a negative output 171. The positive output 170 of transmitter 144 is coupled to one terminal of capacitor C4 and to a positive input 172 of receiver 145. The negative output 171 of transmitter 144 is coupled to one terminal of capacitor C5 and to a negative input 173 of receiver 145. The output of the receiver 145 is coupled to an input of the bandpass filter 146, and the output of the bandpass filter 146 is coupled to an input of the demodulator 147. The output of the demodulator 147 is coupled to an input of the data deserializer 148, and the output of the data deserializer provides DATA OUT 94.

Figure 3:
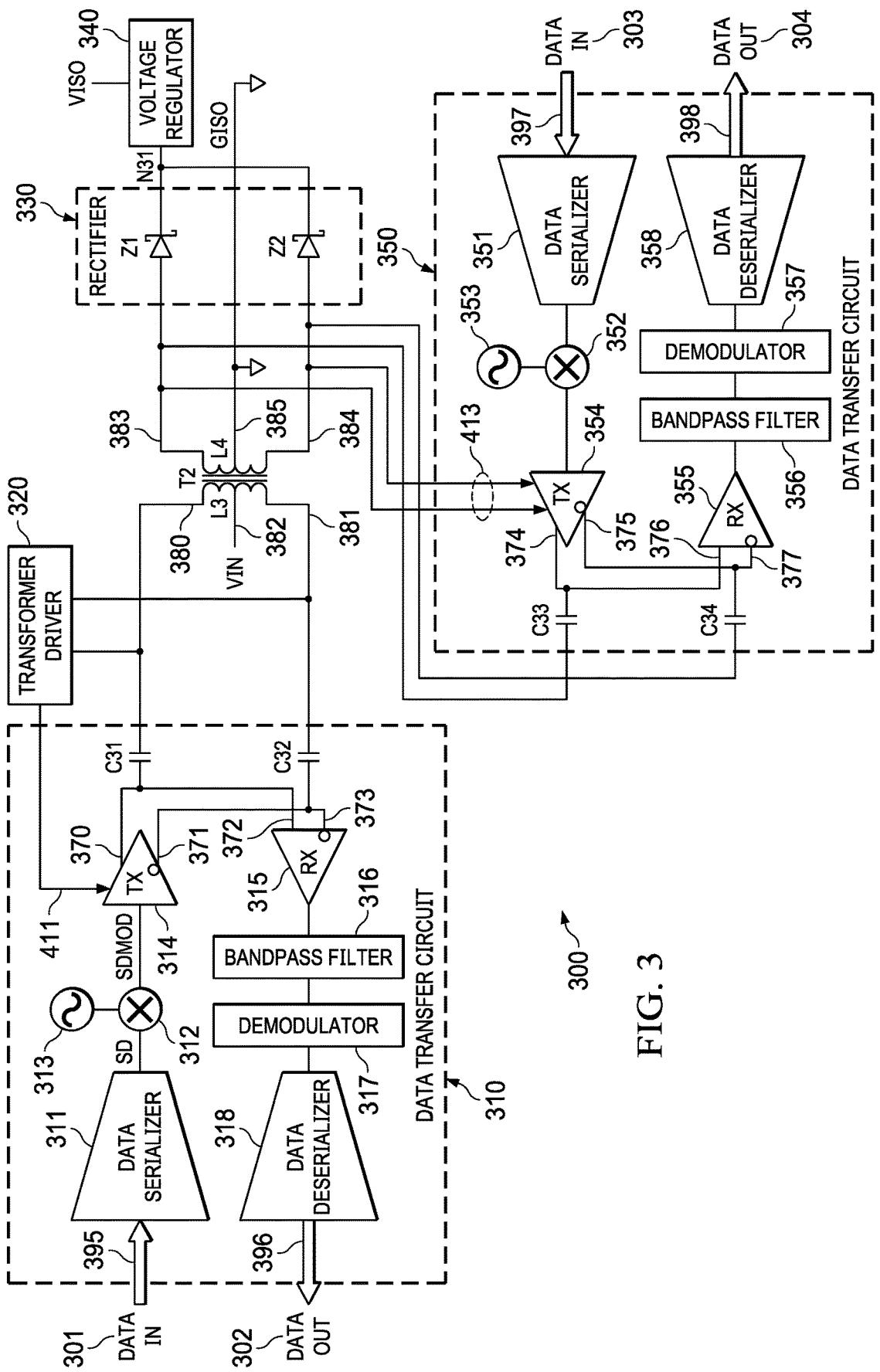
FIG. 3 illustrates another example of an isolation circuit.

The controller 122 switches the transistors PP0, PP1, MN0, and PN1 on and off as explained above to produce a switching waveform across the primary winding L1 of transformer T1. The capacitor C3 across the transformer's secondary winding L2 helps to set the resonance frequency of the secondary side of the transformer to be approximately the same as the switching frequency Fs the switching waveform applied to the primary winding L1. By setting the resonance frequency to equal Fs, a large degree of power is transferred across the transformer to produce the isolated output voltage VISO. In one example, Fs is in the range of 20 MHz to 100 MHz (e.g., 25 MHz). Switching frequencies substantially smaller than 25 MHz (e.g., 200 KHz) are possible as well, but the size of the transformer will need to increase (compared to an Fs of 25 MHz). In one implementation, the transformer T1 is fabricated on a semiconductor die (as illustrated in the example of FIG. 3 and discussed below). If the transformer T1 is forced to be significantly larger due to the use of a small Fs (e.g., 200 KHz), it may become infeasible to fabricate transformer on a semiconductor die. If T1 is too larger for fabrication on a semiconductor die, T1 may be provided as an external device (i.e., external to a die containing the other components shown in FIG. 1).

Data is also magnetically transferred though the same isolation transformer T1 as power. Data serializer 111 converts DATA IN 90 from a parallel format into a serial format, represented in FIG. 1 as serial data (SD). Data serializer 111 may comprise a multiplexer in one example. The frequency of SD is increased by modulator 112. The oscillator 113 produces a clock having a frequency significantly larger than the switching frequency Fs of the bridge 120. In one example, the frequency of oscillator 113 is ten times, 20 times, etc. that of Fs. For example, if Fs is 25 MHz, the frequency of oscillator 113 may be 250 MHz or 500 MHz. The output signal from the modulator 113 is thus a modulated version of SD and is shown as SDMOD.

The primary winding L1 of transformer T1 has a pair of taps 180 and 181 between the outer terminals 160 and 161. The taps can be positioned so as to divide the primary winding into three parts. The taps may be positioned, for example, to break up the primary winding into three equal parts. Capacitor C1 is coupled to tap 180 and capacitor C2 is coupled to tap 181. By coupling the data transfer circuit 110 to the center taps 180, 181 of L1 instead of L is terminals 160, 162, the data transfer circuit 110 is assured of not being coupled to a low impedance load—if terminals 160 and 161 were used, data transfer circuit 110 would experience a low impedance load through the transistors of bridge 120 when opposite pairs of transistors are turned between VCC1 and GND1. Similarly, the secondary winding L2 of transformer T1 also has a pair of central taps 190 and 191. Capacitor C4 is coupled to tap 190 and capacitor C5 is coupled to tap 191.

SDMOD is provided by transmitter 150 to taps 180, 181 of the primary winding L1. A corresponding signal (of the same frequency as SDMOD) is generated on taps 190, 192 of the secondary winding L2 and provided to receiver 145. The receiver provides the received signal to bandpass filter 146 which has a center frequency approximately centered on the carrier frequency of the received data signal to attenuate noise at higher and lower frequencies. The demodulator 147 then demodulates the data signal back to its original data rate and the data deserializer 148 converts the serial signal back to a parallel format as DATA OUT 94.

Data transferred in the opposite direction through the isolation circuit 100 is processed in much the same as that described. Data serializer 141 converts DATA IN 93 to a serial format and modulator 142 uses oscillator 143 to modulate the serial data signal to a higher frequency (substantially higher than Fs). The higher frequency modulated data signal is provided to the secondary winding's taps 190 and 191, and a corresponding data signal is generated on the primary winding's taps 180 and 181. Receiver 115 receives the higher frequency data signal. Bandpass filter 116 filters it and demodulator 117 converts the higher frequency data signal back to its original data rate. Data deserializer 118 converts the recovered data signal back to a parallel format as DATA OUT 91.

Figure 2:
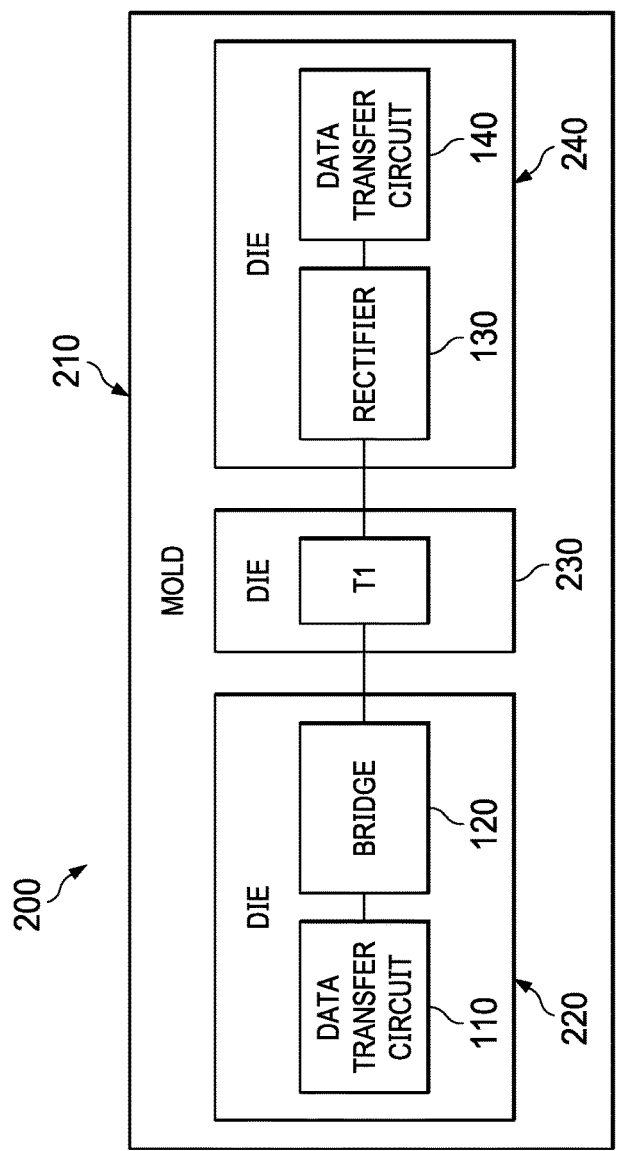
FIG. 2 illustrates a three-die device implementing the isolation circuit of FIG. 1.

FIG. 2 illustrates an example of semiconductor package (also referred to as a "chip") 200 that includes the isolation circuit 100. Semiconductor package 200 in this example includes three dies 220, 230, and 240. All three dies 220, 230, and 240 are encapsulated by mold compound 210 to form a single semiconductor package. Each die has different portions of the isolation circuit 100 of FIG. 1. Die 220 comprises data transfer circuit 110 and bridge 120. Die 230 comprises transformer T1. Die 240 includes rectifier 130 and data transfer circuit 140.

FIG. 3 shows another example of an isolation circuit 300. In this example, isolation circuit 300 includes data transfer circuits 310 and 350, a transformer driver 320, a transformer T2, a rectifier 330, and voltage regulator 340 (e.g., a low dropout voltage regulator). As was the case for isolation circuit 100, the data path through isolation circuit 300 is bi-directional. As such, data transfer circuit 310 includes a data input 395 that can receive incoming data (DATA IN 301) to be transferred through the isolation circuit 300 and output via data output 398 of data transfer circuit 350 as output data (DATA OUT 304). Similarly, data transfer circuit 350 includes a data input 397 that can receive incoming data (DATA IN 303) to be transferred through the isolation circuit 300 and output via data output 396 of data transfer circuit 310 as output data (DATA OUT 302).

Transformer T2 includes a primary winding L3 and a secondary winding L4. Primary winding L3 has opposing terminals 380 and 381 and secondary winding L4 has opposing terminals 333 and 384. Each winding of transformer T2 is centered tap. Primary winding L3 includes a center tap 382 and secondary winding L4 includes a center tap 385. Center tap 382 of the primary winding L3 receives the input voltage VIN. The output of the voltage regulator 340 provides the isolated voltage (VISO) which is galvanically isolated from VIN. The center tap 385 of the secondary winding L4 is connected to the isolated ground (GISO), which is galvanically isolated from the ground reference on the primary side of transformer T2.

The data transfer circuit 310 includes a data serializer 311, a modulator 312, an oscillator 313, a transmitter 314, a receiver 315, a bandpass filter 316, a demodulator 317, a data deserializer 318, and capacitors C31 and C32. Data input 395 of the data transfer circuit 310 is the input to the data serializer 311. The output of the data serializer 311 is coupled to one input of the modulator 312. In one example, the modulator 312 is a mixer. The oscillator 313 is coupled to another input of the modulator 312. The output of the modulator 312 is coupled to an input of the transmitter 314. The transmitter 314 has a positive output 370 and a negative output 371. The positive output 370 of transmitter 314 is coupled to one terminal of capacitor C31 and to a positive input 372 of receiver 315. The negative output 371 of transmitter 314 is coupled to one terminal of capacitor C32 and to a negative input 373 of receiver 315. The output of the receiver 315 is coupled to an input of the bandpass filter 316, and the output of the bandpass filter 316 is coupled to an input of the demodulator 317. The output of the demodulator 317 is coupled to an input of the data deserializer 318, and the output of the data deserializer provides DATA OUT 302.

The transformer driver 320 is coupled across the primary winding L3 of transformer T2 (that is, to terminals 380 and 381). In one example (as will be illustrated in FIG. 4 and described below), transformer driver 320 is configured to operate as a "push-pull" converter.

Rectifier 330 is coupled across the secondary winding L4 of transformer T2 (i.e., to terminals 383 and 384. In the example shown in FIG. 3, rectifier 330 comprises Zener diodes Z1 and Z2. The anode of Z1 is coupled to terminal 383 of the secondary winding L4 and the anode of Z2 is coupled to terminal 384 of the secondary winding. The cathodes of Z1 and Z2 are coupled together at node N31 and to input of voltage regulator 340. The voltage on node N31 is isolated from VIN and the ground reference for VIN and is further converted to the isolated output voltage VISO by the voltage regulator 340.

Data transfer circuit 350 has an architecture similar to that of data transfer circuit 310. Data transfer circuit 350 includes a data serializer 351, a modulator 352, an oscillator 353, a transmitter 354, a receiver 355, a bandpass filter 356, a demodulator 357, a data deserializer 358, and capacitors C33 and C34. Data input 303 of the data transfer circuit 350 is the input to the data serializer 351. The output of the data serializer 351 is coupled to one input of the modulator 352. In one example, the modulator 352 is a mixer. The oscillator 353 is coupled to another input of the modulator 352. The output of the modulator 352 is coupled to an input of the transmitter 354. The transmitter 354 has a positive output 374 and a negative output 375. The positive output 374 of transmitter 354 is coupled to one terminal of capacitor C33 and to a positive input 376 of receiver 355. The negative output 375 of transmitter 354 is coupled to one terminal of capacitor C34 and to a negative input 377 of receiver 355. The output of the receiver 355 is coupled to an input of the bandpass filter 356, and the output of the bandpass filter 356 is coupled to an input of the demodulator 357. The output of the demodulator 357 is coupled to an input of the data deserializer 358, and the output of the data deserializer provides DATA OUT 304.

Figure 4:
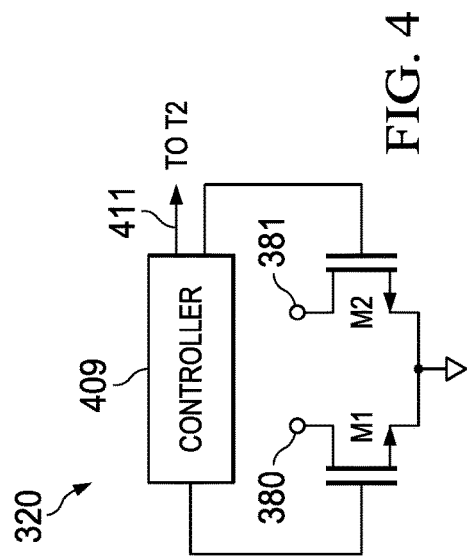
FIG. 4 shows an example transformer driver usable in the isolation circuit of FIG. 3.

FIG. 4 shows an example implementation of transformer driver 320. In this example, transformer driver 320 includes transistors M1 and M2 and controller 409. M1 and M2 comprise NMOS transistors but can comprise other types of transistors. The controller 409 is coupled to the gates of M1 and M2 and provides control signals to the respective gates. The controller 409 reciprocally turns on M1 and M2 such that both M1 and M2 are not on at the same time. That is, M1 is turned on while M2 is off, and then M2 is turned on while M1 is off. Each cycle includes a period of time in which neither transistor is on. When one of M1 and M2 is on, VIN is applied between the center tap 382 and ground with current flowing from the center tap 381 to the drain of the transistor that is on. The voltage reverses across the non-conducting half of the primary winding L3 to maintain volt-second balancing thereby generating 2*VIN across the primary winding L3 between terminals 380 and 381. The same voltage is generated across each corresponding half of the secondary winding L4 but scaled by a factor of N (the turns ratio of transformer T2).

Referring back to FIG. 3, the data transfer circuit 310 is coupled to the terminals 380 and 381 of the primary winding L3 of transformer T2, and data transfer circuit 350 is coupled to terminals 383 and 384 of the secondary winding. More specifically, C31, C32, C33, and C34 are coupled to respective terminals 380, 381, 383, and 384. Data to be transmitted across transformer T2 is synchronized to the operation of the transformer driver 320 such that a transmitter's output provides a data signal to a respective transformer terminal when the corresponding transistor M1/M2 (FIG. 4) coupled to that terminal is off. For example, when M1 (which is coupled to terminal 380) is off, transmitter output 370 (which, through capacitor C31, also is coupled to terminal 380) provides its data signal to terminal 380. The transformer driver 320 has power transistors M1 and M2 that turn ON and OFF at a relatively low frequency (e.g., 300 KHz). The controller 409 of FIG. 4 can signal the transmitter (via control signal 411) when the gate of M1 of FIG. 4 is at 0 V. At that time, the transmitter can drive the high frequency RF signal on to the terminal 380.

Transformer secondary terminals 383 and 384 swing between +ve and −ve voltages around GISO (e.g., +6V and −6V), whereas node N31 is at a constant output voltage (e.g., 6V less one diode voltage drop, or N31's voltage is approximately 5.5V). When terminal 383 is at a −ve potential diode, Z1 is reverse biased, and terminal 383 is at a relatively high impedance. At this point, an RF signal 413 can be coupled between terminal 383 (and 384) and the transmitter 354. This may be clarified in the picture, by showing a connection between 383,384 to the transmitter. While the coordination between the transmitters and the transformer driver 320 may improve the efficiency of the communication, in some implementations, coordination between transmitters and the transformer driver is not present—the transmitter can keep transmitting the high frequency signal, and it will couple to the transformer naturally whenever the transformer is in high impedance (for example, every alternate cycle).

Figure 5:
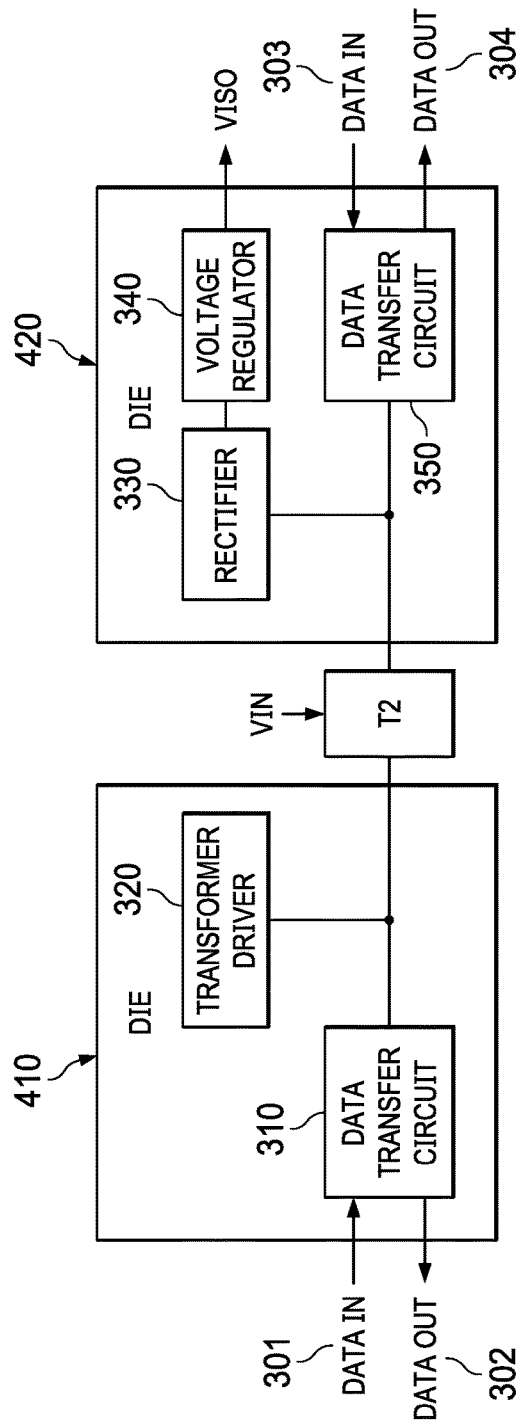
FIG. 5 illustrates a multi-die implementation of the isolation circuit of FIG. 3.

FIG. 5 illustrates an example in which the isolation circuit 300 is fabricated as three separately packaged devices—die 410, die 420, and transformer T2. Each die 410, 420 has different portions of the isolation circuit 300 of FIG. 3. Die 410 includes data transfer circuit 310 and transformer driver 320. Die 420 includes rectifier 330, voltage regulator 340, and data transfer circuit 350. Alternatively, the components of dies 410 and 420 can be fabricated on a single die with transformer T2 being packaged separately.

Figure 6:
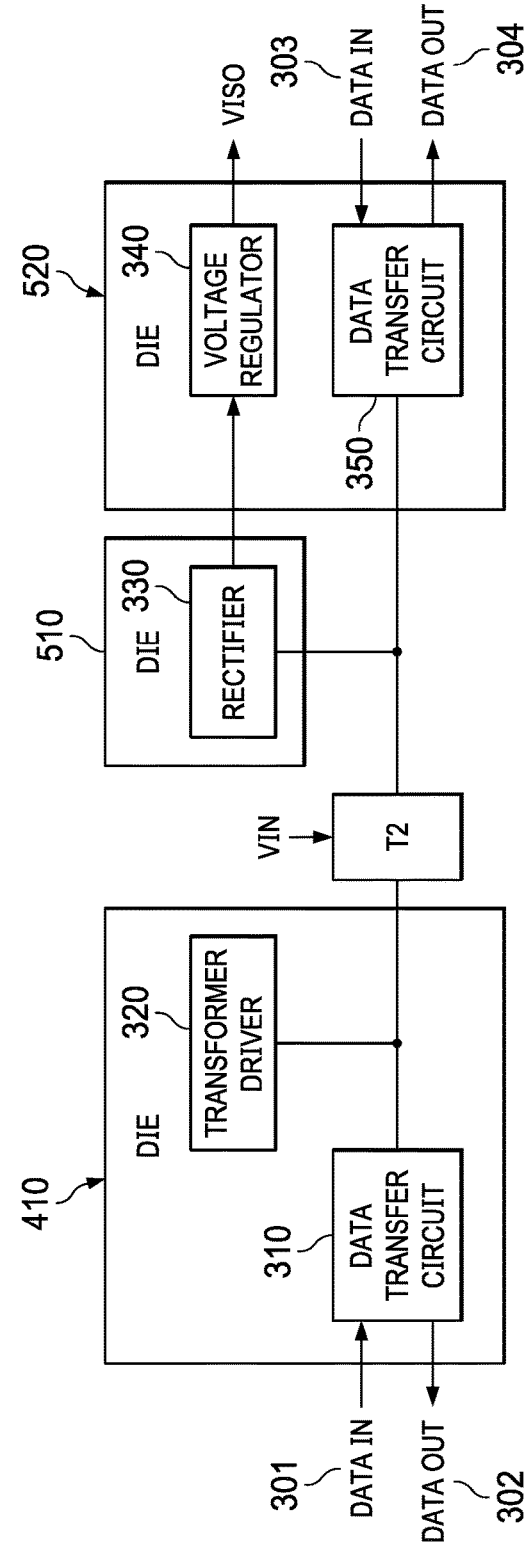
FIG. 6 illustrates another multi-die implementation of the isolation circuit of FIG. 3.

FIG. 6 illustrates an example in which the isolation circuit 300 is fabricated as four separately packaged devices—die 410, die 510, die 520, and transformer T2. Each die 410, 510, and 520 has different portions of the isolation circuit 300 of FIG. 3. Die 410 includes data transfer circuit 310 and transformer driver 320. Die 510 includes rectifier 330. Die 520 includes voltage regulator 340 and data transfer circuit 350.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. An apparatus, comprising:
   a transformer having a primary winding and a secondary winding, the primary winding having first and second terminals and a center tap, and the secondary winding having first and second terminals and a center tap, the center tap of the primary winding coupled to a supply voltage node, and the center tap of the secondary winding providing an isolated ground;
   a first data transfer circuit coupled to the first and second terminals of the primary winding;
   a second data transfer circuit coupled to the first and second terminals of the secondary winding;
   a transformer driver coupled to the first and second terminals of the primary winding; and
   a rectifier having first and second rectifier inputs and a rectifier output, the first rectifier input coupled to the first terminal of the secondary winding, and the second rectifier input coupled to the second terminal of the secondary winding.

2. The apparatus of claim 1, further comprising a voltage regulator having a voltage regulator input and a voltage regulator output, the voltage regulator input coupled to the rectifier output, and the voltage regulator output providing an isolated output voltage.

3. The apparatus of claim 2, further comprising:
   a first die including the first data transfer circuit and the transformer driver; and
   a second die including the rectifier and the second data transfer circuit.

4. The apparatus of claim 3, wherein the second die also includes the voltage regulator.

5. The apparatus of claim 1, wherein the transformer driver comprises a push-pull circuit.

6. The apparatus of claim 1, wherein:
   the first data transfer circuit includes a first transmitter, a first capacitor, and a second capacitor;
   the first transmitter having a first and second transmitter outputs;
   the first capacitor coupled between the first transmitter output and the first terminal of the primary winding; and
   the second capacitor coupled between the second transmitter output and the second terminal of the primary winding.

7. A circuit, comprising:
   a modulator having an input and an output;
   an oscillator coupled to the input of the modulator;

a transmitter having an input and first and second outputs, the input of the transmitter coupled to the output of the modulator;

a transformer driver having first and second terminals;

a first capacitor coupled between the first output of the transmitter and the first terminal of the transformer driver; and a second capacitor coupled between the second output of the transmitter and the second terminal of the transformer driver.

8. The circuit of claim 7, further comprising a receiver having first and second inputs and an output, the first input of the receiver coupled to the first output of the transmitter and the second input of the receiver coupled to the second output of the transmitter.

9. The circuit of claim 8, further including:

filter having an input and an output, the input of the filter coupled to the output of the receiver; and a demodulator having an input coupled to the output of the filter.

10. The circuit of claim 7, wherein the transformer driver includes:

a first transistor coupled to the first capacitor; and a second transistor coupled to the second capacitor.

11. A circuit, comprising:

a modulator having an input and an output;

an oscillator coupled to the input of the modulator;

a transmitter having an input and first and second outputs, the input of the transmitter coupled to the output of the modulator;

a first capacitor having first and second terminals, the first terminal of the first capacitor coupled to the first output of the transmitter;

a second capacitor having first and second terminals, the first terminal of the second capacitor coupled to the second output of the transmitter;

a rectifier having first and second rectifier inputs and an output, the first rectifier input coupled to the second terminal of the first capacitor and the second rectifier input coupled to the second terminal of the second capacitor; and a ground terminal configured to be coupled to a center tap of a first winding of a transformer, the first rectifier input configured to be coupled to a first terminal of the first winding and the second rectifier input configured to be coupled to a second terminal of the first winding.

12. The circuit of claim 11, further comprising a voltage regulator having an input, the input of the voltage regulator coupled to the output of the rectifier.

13. The circuit of claim 12, further comprising:

a first die including the modulator, the oscillator, the transmitter, the first capacitor, the second capacitor, and the voltage regulator; and a second die including the rectifier.

14. The circuit of claim 12, further comprising a die including the modulator, the oscillator, the transmitter, the first capacitor, the second capacitor, the rectifier, and the voltage regulator.

15. The circuit of claim 11, further comprising a receiver having first and second inputs and an output, the first input of the receiver coupled to the first output of the transmitter, and the second input of the receiver coupled to the second output of the transmitter.

16. The circuit of claim 15, further comprising:

a filter having an input and an output, the input of the filter coupled to the output of the receiver; and a demodulator having an input coupled to the output of the filter.

17. An apparatus, comprising:

a transformer having a primary winding and a secondary winding, the primary winding having first and second terminals and a center tap, and the secondary winding having first and second terminals and a center tap, the center tap of the primary winding coupled to a supply voltage terminal, and the center tap of the secondary winding providing an isolated ground;

a first data transfer circuit coupled to the first and second terminals of the primary winding;

a second data transfer circuit coupled to the first and second terminals of the secondary winding; and a push-pull circuit coupled to the first and second terminals of the primary winding.

18. The circuit of claim 17, further comprising a rectifier having first and second rectifier inputs and a rectifier output, the first rectifier input coupled to the first terminal of the secondary winding, and the second rectifier input coupled to the second terminal of the secondary winding.

19. The circuit of claim 17, wherein the push-pull circuit includes:

a first transistor coupled between the first terminal of the primary winding and a ground terminal;

a second transistor coupled between the second terminal of the primary winding and the ground terminal; and a controller coupled to a control terminal of each of the first transistor and the second transistor.

20. The circuit of claim 17, wherein each of the first and the second data transfer circuit includes:

a transmitting chain having a data serializer, a modulator, and a transmitter; and a receiving chain having a receiver, a filter, a demodulator, and a data deserializer.

* * * * *